United States Patent [19]

Iijima

[11] Patent Number: 5,644,750
[45] Date of Patent: Jul. 1, 1997

[54] DATA STORAGE APPARATUS HAVING MEMORY AREA WITH A PREDETERMINED LOGIC TYPE

[75] Inventor: Yasuo Iijima, Yokohama, Japan

[73] Assignee: Kabushiki Kaisha Toshiba, Kawasaki, Japan

[21] Appl. No.: 215,728

[22] Filed: Mar. 22, 1994

[30] Foreign Application Priority Data

Mar. 29, 1993 [JP] Japan ................... 5-069783

[51] Int. Cl.$^6$ ........................... G06K 5/00
[52] U.S. Cl. ............... 395/427; 395/481; 395/405; 364/244.2; 364/259.1; 364/DIG. 1; 235/380; 235/437
[58] Field of Search ................... 395/425, 600, 395/427, 481, 405; 365/230.01, 185.17; 235/380, 437; 380/23, 25; 902/26; 371/51.1, 21.6, 27; 364/244.2, DIG. 1

[56] References Cited

U.S. PATENT DOCUMENTS

| 4,782,487 | 11/1988 | Smelser | 371/21 |
|---|---|---|---|
| 4,985,920 | 1/1991 | Seki | 380/23 |
| 5,161,256 | 11/1992 | Iijima | 902/26 |
| 5,224,107 | 6/1993 | Mattes | 371/51.1 |
| 5,226,155 | 7/1993 | Iijima | 395/600 |
| 5,293,424 | 3/1994 | Holtey et al. | 380/23 |
| 5,333,292 | 7/1994 | Takemoto et al. | 395/425 |
| 5,365,045 | 11/1994 | Iijima | 235/380 |
| 5,379,262 | 1/1995 | Okamoto et al. | 365/230.01 |
| 5,428,685 | 6/1995 | Kadooka et al. | 380/25 |

FOREIGN PATENT DOCUMENTS

| 0213534 | 3/1987 | European Pat. Off. . |
|---|---|---|
| 0357361 | 3/1990 | European Pat. Off. . |
| 62060081 | 3/1987 | Japan . |

OTHER PUBLICATIONS

Publication No. JP4040587, Patent Abstracts of Japan, vol. 16, No. 218.
Publication No. JP62060081, Patent Abstracts of Japan, vol. 11, No. 253.
Publication No. JP2144644, Patent Abstracts of Japan, vol. 14, No. 385.

Primary Examiner—Thomas G. Black
Assistant Examiner—Greta L. Robinson
Attorney, Agent, or Firm—Cushman, Darby & Cushman IP Group of Pillsbury Madison & Sutro LLP

[57] ABSTRACT

A data memory of an IC card is divided into a plurality of areas, a logic type used when data is written in each area is set, and the logical AND between the written data and stored data in the memory is calculated by an AND logic circuit and written in the memory. In read access, output data can be directly obtained from the memory.

19 Claims, 9 Drawing Sheets

DATA STORAGE APPARATUS HAVING MEMORY AREA WITH A PREDETERMINED LOGIC TYPE

Background of the Invention

1. Field of the Invention

The present invention relates to a data storage apparatus, provided in an electronic IC card incorporating an IC chip having a nonvolatile memory and a control element for controlling the nonvolatile memory, which apparatus provided in an electronic IC card incorporating an IC chip having a nonvolatile memory and a control element for a predetermined type which are divisionally set in the memory, an example of the electronic apparatus being an IC card incorporating an IC chip having a nonvolatile memory and an example of the control element being a CPU.

2. Description of the Related Art

In recent years, a popular portable data storage medium has emerged including an IC card incorporating an IC chip having a nonvolatile data memory and a control element such as a CPU for controlling the nonvolatile memory.

In an IC card of this type, an incorporated data memory is divided into a plurality of areas, and data processed in a predetermined application are stored in the areas, respectively. A method of writing or reading binary data is typically used to access the data in these areas.

An IC card having the above-mentioned is described in Japanese Patent Application (KOKAI) Publication No. 4-40587 corresponding to U.S. patent application Ser. No. 07/710,025 now U.S. Pat. No. 5,365,045.

In this IC card, an area of a memory that is allocated to a user, known as "a user's area", is divided into a plurality of sub-areas. A prescribed initial code such as "FF" or "00 is written to each user's area, and used to confirm the reliability of the user's area by checking whether the prescribed code is correctly written or not. However, other data cannot be written into the user's area using the same method for both the initial code "FF" and the initial code "00". Rather, when the initial code is "FF", data must be written using AND logic, and when the initial code is "00", data must be written using OR logic.

Accordingly, when an IC card is processed in an IC card processing apparatus, the IC card memory must indicate the a prescribed initial logic condition, e.g., AND logic condition or the OR logic condition. If an IC card having a memory having a different logic condition, than that prescribed, is inserted into the IC card processing apparatus, this card cannot be processed therein. For example, when the prescribed writing method for a device is based on the AND logic and user's areas have a corresponding initial code of "FF", a card having an initial code of "φφ" cannot be written to.

Moreover, for an IC card provided as a multi-purpose card suited for a plurality of user's systems to conventional system requires, an initial status inherent to each user's system to be stored in each user's area when the IC card is issued.

However, when different initial logic conditions are set in the memory areas provided for the plurality of user's system, it is necessary to change the logic condition of data to be written in the different user's area of the memory, thereby lowering the processing speed for issuing the IC card.

SUMMARY OF THE INVENTION

It is an object of the present invention to provide a data storage apparatus capable of considerably increasing the processing speed associated with a process for dividing a memory into a plurality of areas.

According to an aspect of the present invention, a data storage apparatus for writing into a memory data received from an external device comprises a memory to which data received from the external data is written, means for storing data representing whether a state of an empty area of the memory is "0" or "1", a first writing means for writing into the memory the data received from the external device with a received state, second writing means for writing into the memory the data received from the external device after binary logic of bits of the data is inverted, and means for selecting one of the first and second writing means based on the data stored in the storing means.

According to another aspect of the present invention, a data storage apparatus, having a memory divided into a plurality of areas, for writing or reading data in/from the divided areas, comprises logic type setting means for setting a logic type used when data is written in the areas, first writing means for directly writing received write data in the areas, second writing means for inverting and writing the received data in the areas, first reading means for directly reading and outputting the data from the areas, second reading means for inverting, reading, outputting the data from the areas, and selecting means for selecting one of the first and second writing means and one of the first and second reading means on the basis of the logic type set by the logic type setting means.

According to further aspect of the present invention, a data storage apparatus, having a memory having a predetermined logic type and divided into a plurality of areas, for writing/reading data in/from the divided areas, comprises logic type setting means for setting a logic type used when data is written in the areas, first writing means for directly writing received write data in the areas, second writing means for inverting and writing the received data in the areas, first reading means for directly reading and outputting the data from the areas, second reading means for inverting, reading, and outputting the data from the areas, and selecting means for selecting the first writing means and the first reading means when the logic type of the areas set by the logic type setting means coincides with a logic type of the memory, and for selecting the second writing means and the second reading means when the logic type of the areas does not coincide with the logic type of the memory.

According to the present invention, when areas having different logic types are set in the same memory, the initial states of the areas need not be set according to the logic types. Therefore, the processing speed associated with a process for dividing a memory into a plurality of areas is considerably increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

An embodiment of the present invention will be described below with reference to the accompanying drawings.

Figure 1:
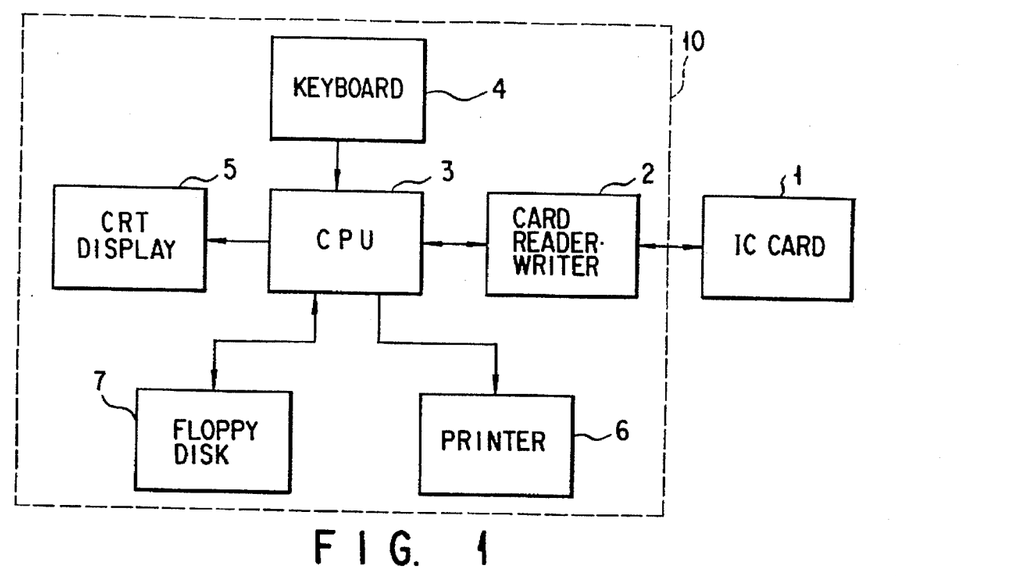
FIG. 1 is a block diagram showing the arrangement of a card handling apparatus to which an IC card according to an embodiment of the present invention is applied.

FIG. 1 shows the arrangement of a card processing device 10 which is used as a terminal device for, e.g., a banking system or shopping system as shown, an IC card serving as a portable electronic device according to this embodiment is applied to card processing device 10. That is, an IC card 1 can be connected to a control unit 3, e.g., CPU, through a card reader/writer 2. In addition to card reader/writer 2, a keyboard 4, a CRT display 5, a printer 6, and a floppy disk 7 are connected to the control unit 3, thereby constituting the device 10.

Figure 2:
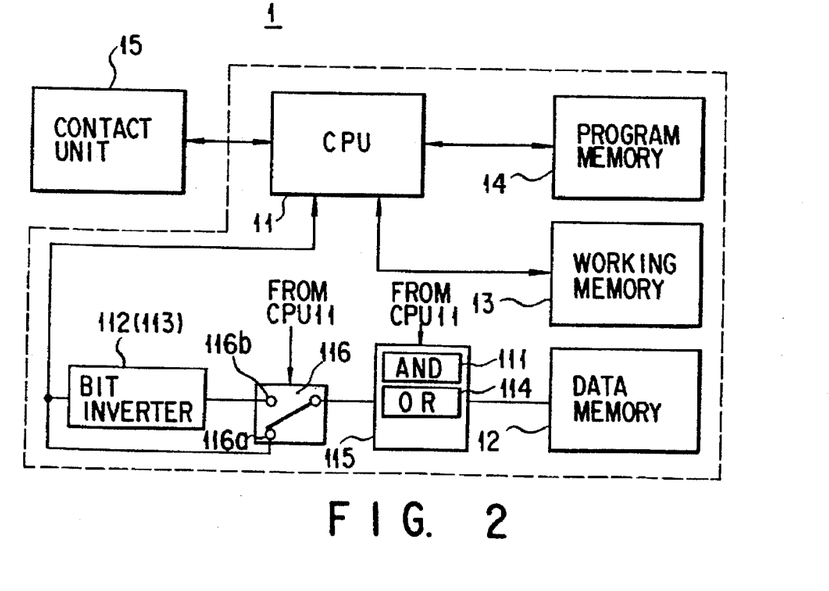
FIG. 2 is a block diagram showing the arrangement of the IC card.

FIG. 2 shows the arrangement of the IC card 1. The IC card 1 includes a CPU 11 serving as a control unit, a programmable nonvolatile data memory 12, a working memory 13, a program memory 14, and a contact unit 15 for obtaining electrical contact with the card reader/writer 2 of the processing device 10. Of these constituent elements, the elements surrounded by a dashed line in FIG. 2 (the CPU 11, the data memory 12, the working memory 13, and the program memory 14) are included in one IC chip and mounted in the IC card main body. Note that the elements surrounded by the dotted line may alternatively be included in a plurality of IC chips. The data memory 12 is used to store various data, and is constituted by, e.g., an EEPROM. The working memory 13 is a memory, e.g., a RAM, for temporarily holding process data used when the CPU 11 performs data processing. The program memory 14 is constituted by, e.g., a mask ROM, and stores a program for the CPU 11 or the like.

Figure 3:
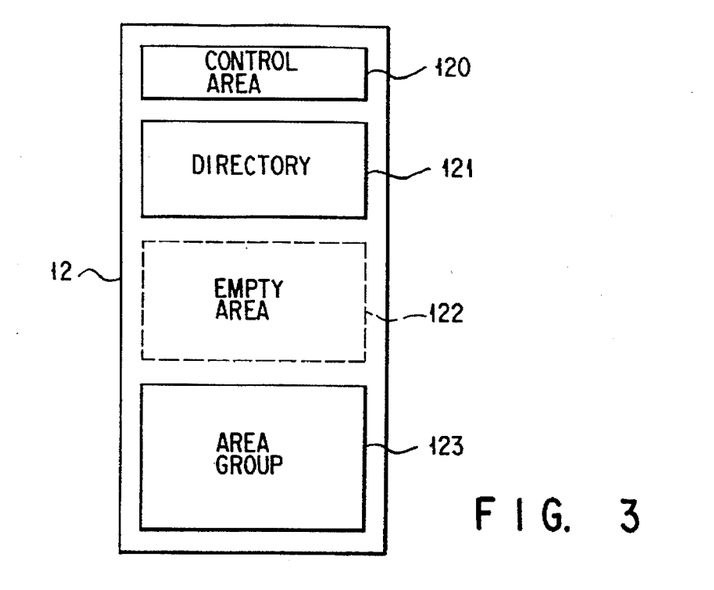
FIG. 3 is a memory map showing the arrangement of a data memory.

The data memory 12, as shown in FIG. 3, is divided into a control area 120, a directory area 121, an empty area 122, and an area group 123. The control area 120, empty area 122, and area group 123 are managed by the directory area 121.

Figure 4:
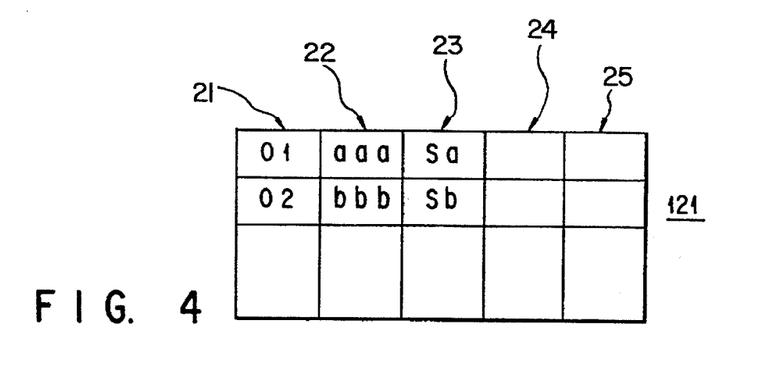
FIG. 4 is a view showing the arrangement of a directory set in the data memory.

The directory area 121, as shown in FIG. 4, is constituted by areas for storing a set of area defining information, each having an area number 21, a top address 22, a size 23, an attribute 24, and a check code 25. For example, the top address 22 of area [01] is address aaa, and the size 23 of area [01] is Sa bytes.

Figure 5:
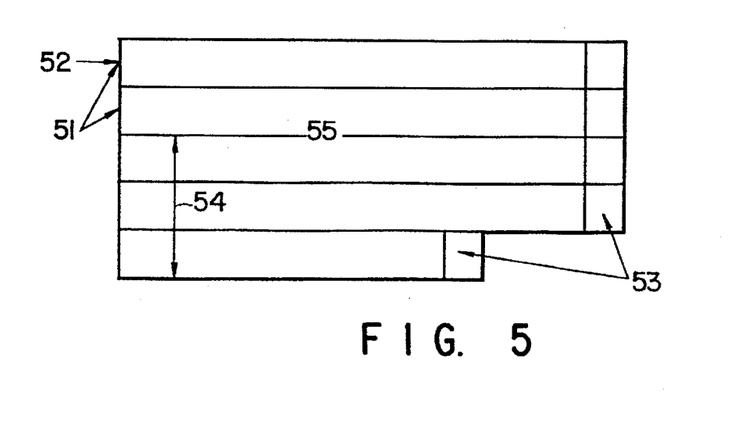
FIG. 5 is a view showing the format of an area set in the data memory.

FIG. 5 shows the format of each area. As shown in FIG. 5, each area includes a single word or a plurality of words and each has a data storage area 55 and a BCC (block check character) storage area 52. When the size of a given area is calculated, and the size is 2 to 256 bytes, the given area is constituted by one word. When the size is larger than 256 bytes, the given area includes one 256-byte word and a word having remaining bytes (including one BCC byte). When the size is less than 256, the area includes a word of less bytes. For example, an area having a size of 65 bytes is is represented by one 65-byte word (a 64-byte data storage area and a 1-byte BCC storage area).

When the size is 550 bytes, an area includes three words, i.e., two 256-byte words (a 255-byte data storage area and a 1-byte BCC storage area) and a 38-byte word (a 37-byte data storage area and a 1-byte BCC storage area).

As shown in FIG. 5, relative address values are used to identify each area such that the top address of the area is set to be '0000'. The address is numbered except for a BCC storage area (for this reason, an application area can be accessed regardless of the presence of the BCC storage area). Therefore, the final address of the area is calculated by the following equation.

final address=(upper byte of Sn) * 255+(lower byte)

Figure 6:
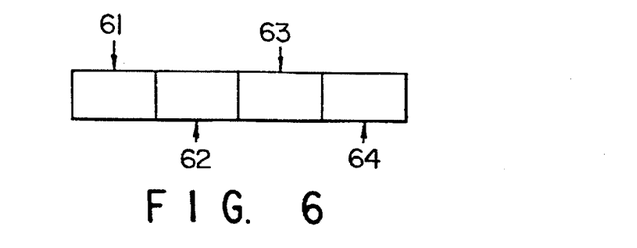
FIG. 6 is a view showing the format of a data read command.

The following three types of access commands are known for each area. The first access command is a command for reading data from an area. As shown in FIG. 6, thus command is constituted by a function code 61 representing a read command, an area number 62 to be accessed, information 63 representing the top address of a range to be accessed, and information 64 for setting the number of bytes of data to be read.

Figure 7:
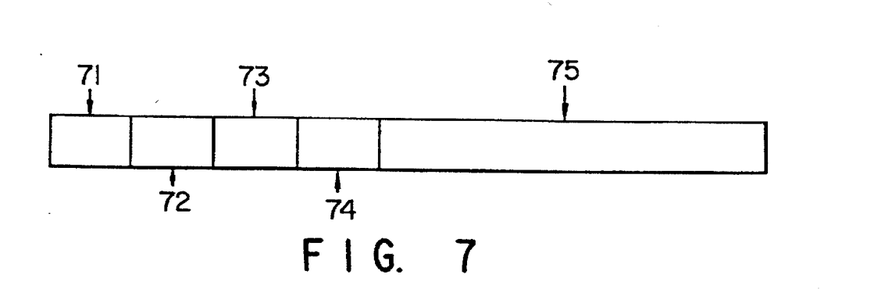
FIG. 7 is a view showing the format of a data write command.

The second access command is a command for writing data in an area as shown in FIG. 7, the second access command is constituted by a function code 71 representing a write command, an area number to be accessed, information 73 representing the top address of a range to be accessed, the number 72 of bytes of data to be written 74, and the data to be written 75.

Figure 8:
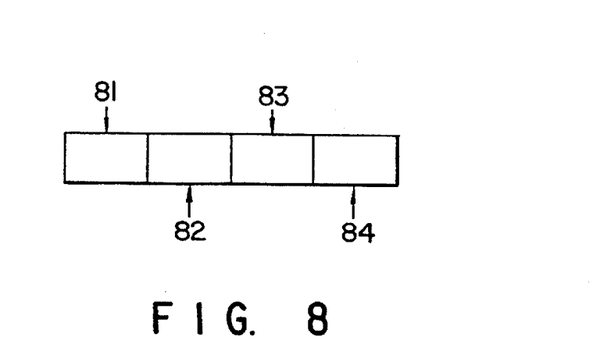
FIG. 8 is a view showing the format of a data erase command.

The third access command is a command for erasing data from the area. As shown in FIG. 8, the third access command is constituted by a function code 81 representing an erase command, an area number 82 to be accessed, information 83 representing the top address of a range to be accessed, and the number of bytes of data to be erased 84.

Figure 9:
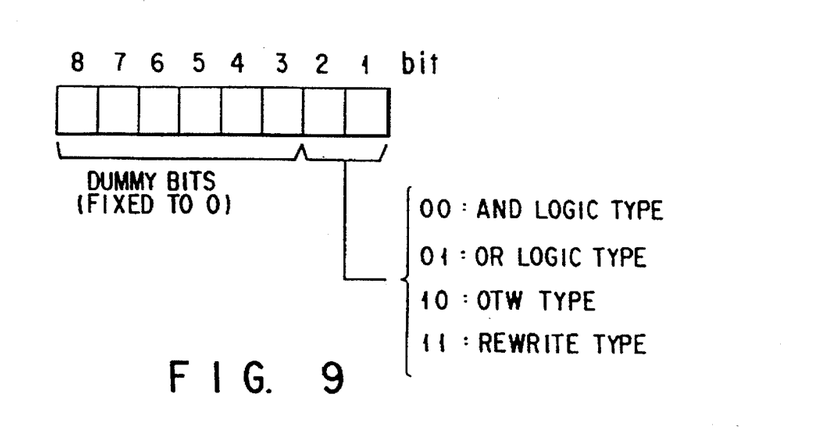
FIG. 9 is a view showing the format of area attribute information.

Attribute information having a format shown in FIG. 9 is set in each area. As shown in FIG. 9, the following modes, i.e., attributes are defined in units of areas by the upper significant bits "1" and "2". The remaining 6 bits are dummy bits fixed to "0".

(1) AND Logic Type

The logical AND between stored data and given data is calculated using "AND logic". The logical AND is written in an area (corresponding to an overwrite operation when the initial state of a bit is set to be "1").

(2) OR Logic Type

The logical OR between the stored data and the given data is calculated using "OR logic". The logical OR is written in an area (corresponding to an overwrite operation when the initial state of a bit is set to be "0").

(3) OTW Type When set to OTW type given data is written in an area only when the stored data is set in an initial state.

(4) REWRITE Type

The stored data is rewritten with the given data.

Figure 10:
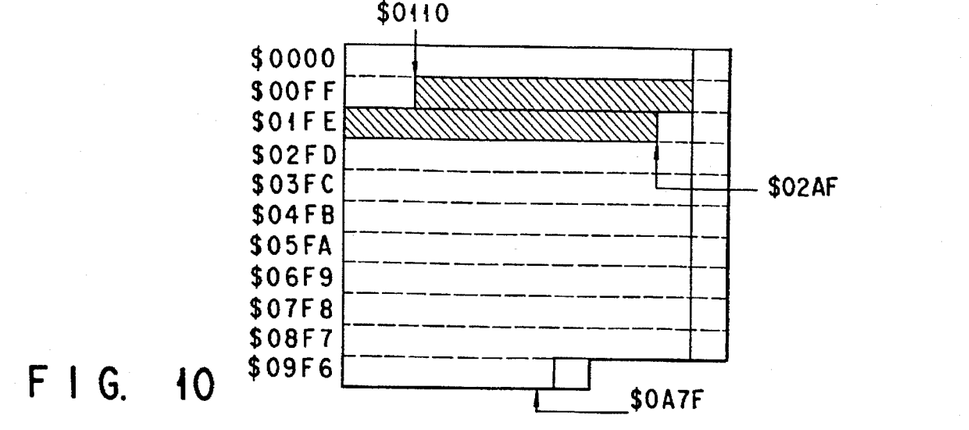
FIG. 10 is a view showing a data storage area.

Write control to the modes described above will be described below with reference to FIG. 10. FIG. 10 shows a state wherein data is written in an area starting from relative address $0110 to relative address $02AF (the remaining area is set in an empty state) in an area in which a data storage area has 2,687 bytes (area size: 2,698 bytes) as the total number of bytes. Note that although the data in the remaining area set in the empty state is output in response to the data read command, at this time, the values of areas are different from each other depending on the attributes of the areas to be accessed. For example, (a) for an area based on AND logic: the data in remaining area set at '00' to indicate an empty state;

(b) for an area based on OR logic the empty state is represented by: 'FF'.

Figure 11:
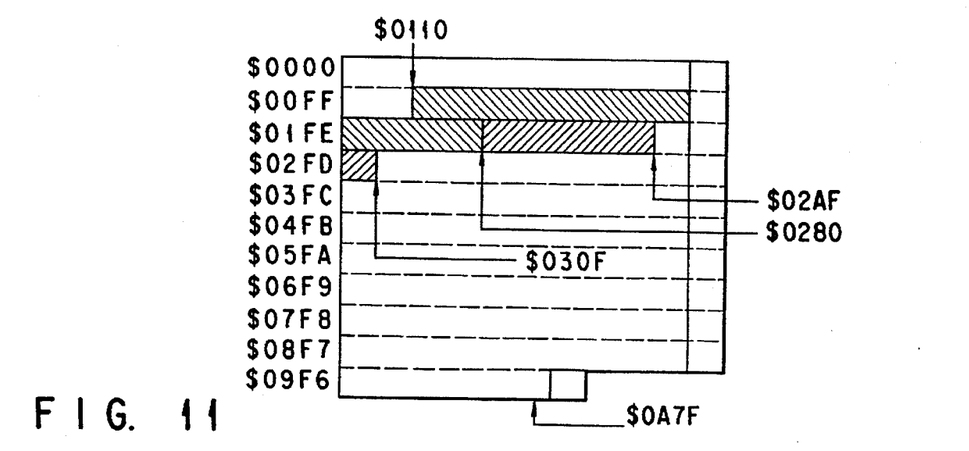
FIG. 11 is a view showing a state obtained after data are written in the area.

In this state, as shown in FIG. 11, an operation of writing 144-byte data starting from address $0280 is considered. This operation is changed depending on the attributes of areas.

When an area is based on AND logic, the logical AND between stored data stored at addresses between address $0280 and address $030F and input data is calculated using AND logic, and the calculation result is written in the area. When an area is based on OR logic, the logical OR between the stored data and the input data is calculated using OR logic, and the calculation result is written in the area. When an area is based on of OTW logic, and contains stored data other than that representing the empty state an area to be written, a data write command is rejected. In addition, when an area is based on write logic, the input data is written (rewritten) independently of the stored data contained in the area being written.

Figure 12:
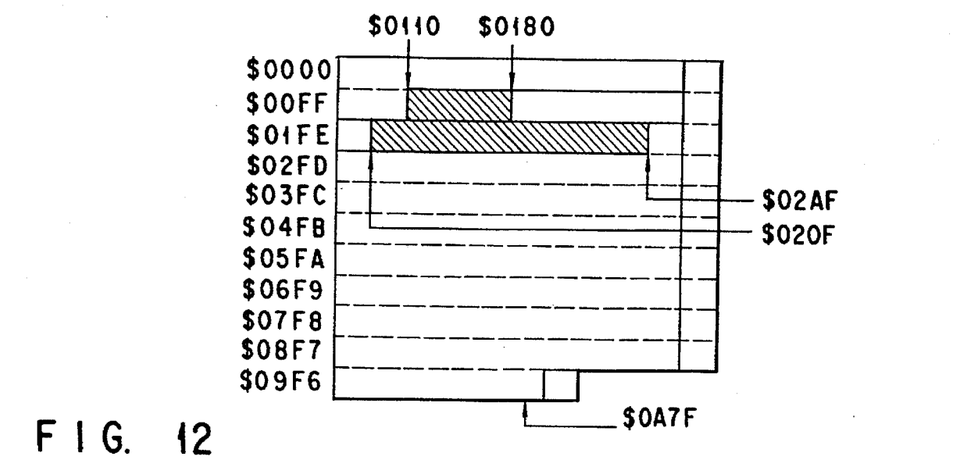
FIG. 12 is a view showing a state obtained after data are erased from the data storage area.

Erase control to each mode will be described below with reference to FIG. 12. In the state shown in FIG. 10, an operation of erasing data at addresses between address $0180 and address $020F is considered. In this case, when the top address is designated as address $0180 by the data erase command described above, and the number of bytes of data to be erased is designated as '90' Hex (i.e., 144 bytes), the following result is obtained.

As described above, "AND logic" or "OR logic" write access is determined by the attribute of each area. However, in a memory supported by an IC card, an initial state is generally set to be 'FF' or '00'. For this reason, in the former, basically, an area of "AND logic" type is obtained; in the latter, an area of "OR logic" type is obtained.

At this time, when an area defined by the "OR logic" is to be set in a memory having an initial state of 'FF', all data in this area must be initialized to be '00' in an initial state. For this reason, areas having different attributes can be realized in a memory having a single attribute.

Figure 13:
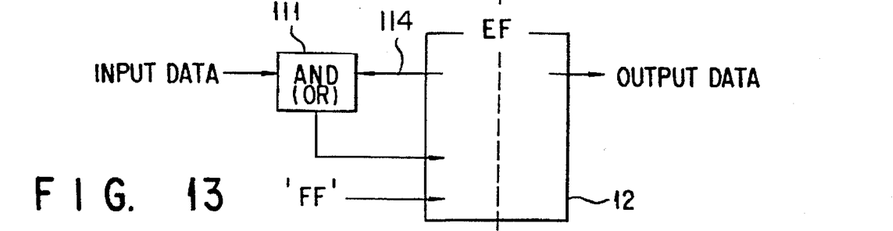
FIG. 13 is a view for explaining access control to an area of AND logic.

As shown in FIG. 13, in an area of AND logic in a memory that is preset with an AND logic set at "FF", the logical AND between input data and the stored data from the data memory 12 is calculated by an AND logic circuit 111 during a write access, and the calculation result is written in the data memory 12, thereby obtaining the area of AND attribute in the memory 12. In addition, in read access, the data from the memory 12 is directly output.

Figure 14:
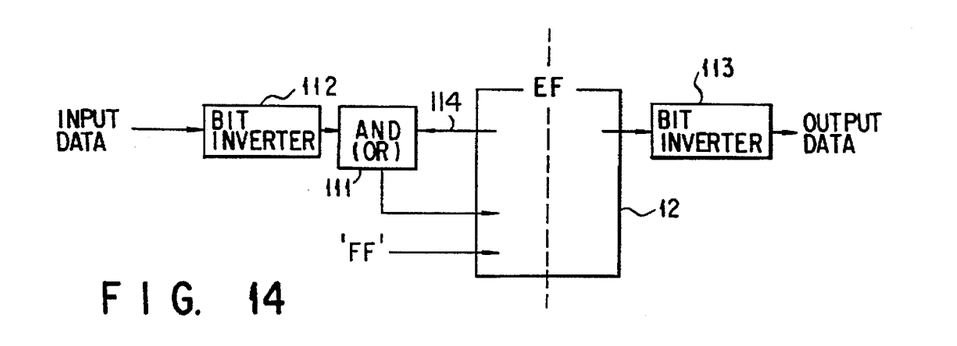
FIG. 14 is a view for explaining access control to an area of OR logic.

Alternatively, as shown in FIG. 14, in an area of OR logic in a memory 12 that is preset with an AND logic set at "FF" the logical AND between a resultant value obtained by inverting input data by a bit inverter 112 (for example, the data can be inverted by calculating the exclusive-OR between the input data and '00' data) and the stored data from the memory 12 is calculated by the AND logic circuit 111, and the calculation result is written in the memory 12, thereby obtaining the area of OR logic in the memory 12. In addition, in read access, a resultant value obtained by inverting the data in the memory 12 by an inverter 113 is output.

In FIGS. 13 and 14, areas set in the memory 12 of an AND logic set are exemplified.

As shown in FIG. 2, the circuitry connected between the CPU 11 and the data memory 12 is provided to be used commonly for the circuits shown in FIGS. 13 and 14. When the circuitry of FIG. 2 is used as the circuit of FIG. 13 as described above, the AND logic circuit 111 is selected by the CPU in the logic circuit 115 and the switch 116 is switched to the contact 116a. While, in the case of FIG. 14 described above, the switch 116 is switched to the contact 116b to select the bit inverter 112 which is also used as the bit inverter 113 when the operation mode is switched to the read access operation to invert the output of the memory 12.

On the other hand, when the attribute of the memory 12 is OR logic, and data is to be written in an area of the memory 12 preset with "FF" according to an AND logic set, as in the case of FIG. 14, the switch contact 116b and OR logic circuit 114 in the logic circuit 115 are selected by the CPU 11 and the data is inverted in the bit inverter 112, the logical OR between the inverted data and the stored data read from the memory 12 is calculated using the OR logic circuit 114 in place of the AND logic circuit 111, and the calculation result is written in the area of the memory 12. In addition, in read access, the contents of the memory area are inverted by the bit inverter 112 used as the bit inverter 113 as shown in FIG. 14 and output as in FIG. 14.

When an area of OR logic in the memory 12 preset with 'φ' according to an OR logic attribute is used, the switch contact 116a is selected and the data is not inverted in write access of the data, the logical OR between the stored data and the input data is calculated using the OR logic circuit 114 in place of the AND logic circuit 111 in FIG. 13, and the calculation result is written in this area. In addition, in read access, the contents of the area are directly output without being inverted.

Figure 15:
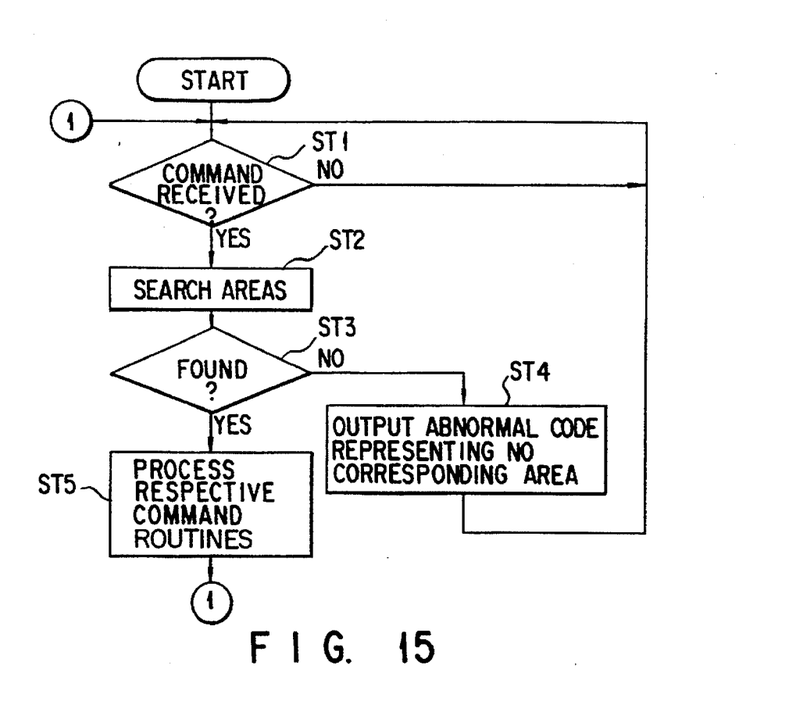
FIG. 15 is a flow chart for explaining an initial operation of the IC card.

An operation of the IC card 1 will be described below with reference to FIG. 15. When the IC card 1 is inserted into the terminal device 10, the IC card 1 receives a source voltage and a reset signal from the terminal device 10 through the contact unit 15 so as to be electrically activated. In this state, the IC card 1 is set in a command wait state in step ST1, where the IC card 1 continuously waits for a command. When the command from the terminal device 10 is input to the IC card 1, the flow advances to step ST2 to extract an area number from the command and to check whether the corresponding area number is present in the directory 121. If the area number is not present in the directory 121, the flow advances from step ST3 to step ST4 to output an abnormal code representing no corresponding area, and returns to step ST1 to set the command wait state.

If the area number is present in the directory 121, the flow advances to step ST5 to perform a process in each command routine corresponding to a function code of the input command and to output the processing result, and the flow returns to step ST1 to set the command wait state.

Figure 16:
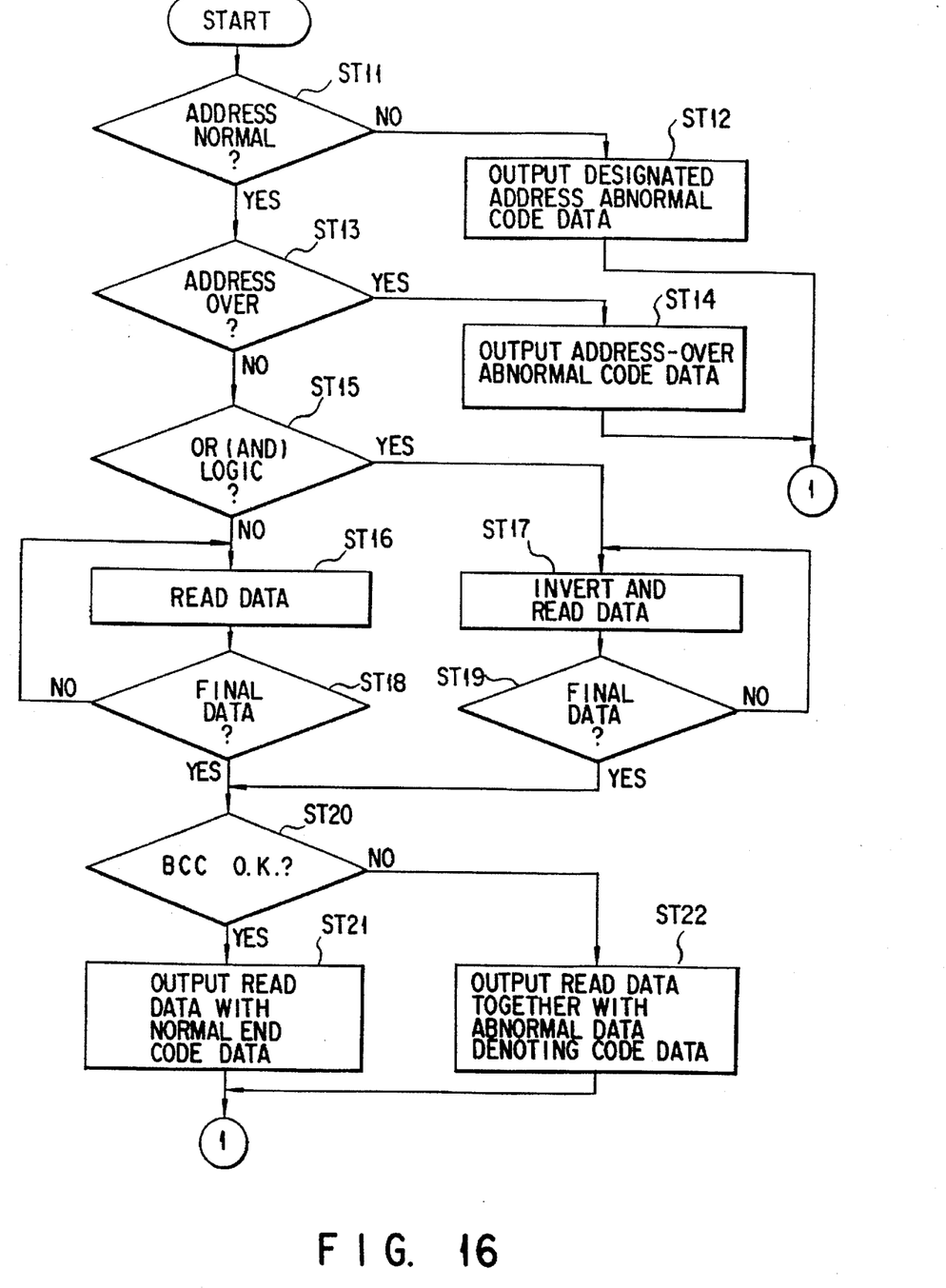
FIG. 16 is a flow chart for explaining an operation performed by the data read command.

An operation of a data read command will be described below with reference to FIG. 16. As shown in FIG. 16, step ST11 checks whether the top read address in the command is set within a designated area. At this time, the lower limit of the range of address values is '0000' and the upper limit of the range is the final address of the corresponding area. In step ST11, when the designated top address falls outside the designated range, designated address abnormal code data is output in step ST12, and the flow returns to step ST1 to set the command wait state.

When the address value is set within the range, step ST13 checks whether data corresponding to the number of bytes of data to be read is present in the corresponding area. For this purpose, a value obtained by adding the number of bytes of the data to the designated address and subtracting "1" therefrom is compared to the final address of the corresponding area. If the value is larger than the final address, the flow advances to step ST14 to output address over abnormal code data, and returns to step ST1 to set the command wait state.

If NO in step ST13, the flow advances to step ST15 to check the attribute of the corresponding area and to check whether the attribute is "OR logic". If NO in step ST15, the flow advances to step ST16 to read data corresponding to the designated number of bytes starting from a designated address and to directly output it. If YES in step ST15, the read data is inverted and output in step ST17. These processes are continuously performed until final data is detected in steps ST18 and ST19.

When the final data is detected, validity of the read data is checked using a BCC accompanying a word having data to be read in step ST20. If the read data is normal, the read data is output together with normal end code data in step ST21, and the flow returns to step ST1 to set the command wait state. If abnormal data is detected using the BCC, the read data is finally output together with abnormal data denoting code data in step ST22, and the flow returns to step ST1 to set the command wait state.

Figure 17:
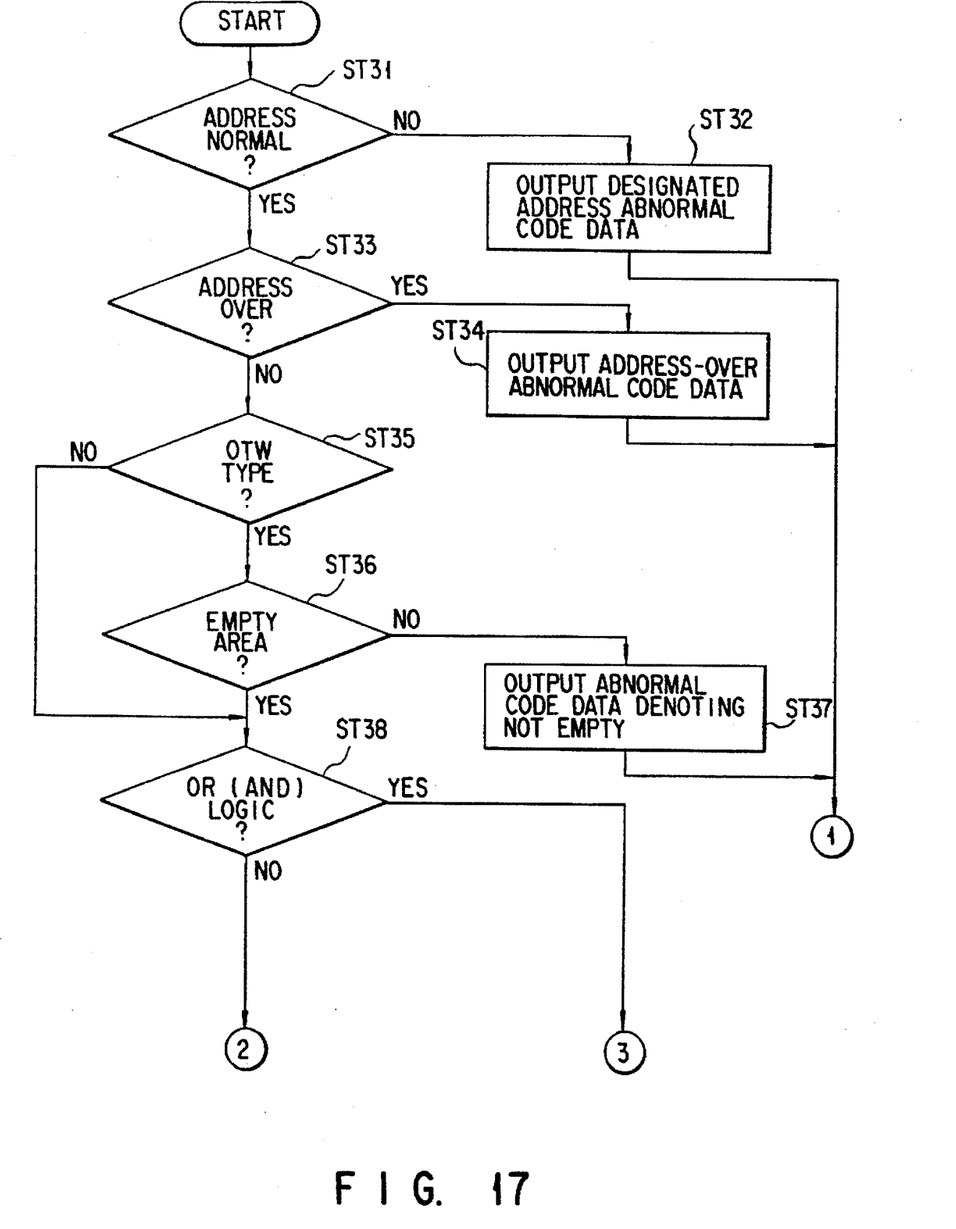
FIG. 17 is a flow chart for explaining an operation performed by the data write command.

A data write operation will be described with reference to FIGS. 17 and 18. As shown in FIG. 17, step ST31 checks whether the top write address in a command is set within a designated area. At this time, the lower limit of the range of address values is '0000', and the upper limit of the range is the final address of the corresponding area. In this check operation, when the designated top address falls outside the range, the flow advances to step ST32 to output designated address abnormal code data, and returns to step ST1 to set the command wait state.

When the address value is set within the range, step ST33 checks whether an address is over, i.e., whether a write area corresponding to the number of bytes of data to be written is present in the corresponding area. For this purpose, a value obtained by adding the number of bytes of data to be written to the designated address and subtracting "1" therefrom is compared with the final address of the corresponding area. If the value is larger than the final address, the flow advances to step ST34 to output address over abnormal code data, and returns to step ST1 to set the command wait state.

If the write area corresponding to the number of bytes of the data to be written is present in the corresponding area, step ST35 checks whether the attribute of the area is an "OTW" type. If NO in step ST35, the operation shifts to the write operation of step ST38. If YES in step ST35, step ST36 checks whether all areas to be written are empty areas is set, as indicated by 'FF' for AND logic memory areas and '$\phi\phi$' for OR logic memory areas. If NO in step ST36, abnormal code data denoting not empty is output in step ST37, and the flow returns to step ST1 to set the command wait state. If YES in step ST36, a write operation from step ST38 is started.

In the write operation, an area attribute is referred to in step ST38 to check whether the area attribute is "OR logic". If YES in step ST38, the flow advances to step ST39 in FIG. 18. The AND (logical AND) between data generated by inverting the stored data as shown in FIG. 14 and the stored data of the area to be written is calculated, and the calculation result is written in the memory 12. If NO in step ST38, step ST40 checks whether the attribute represents a rewritable area. If YES in step ST40, data corresponding to the designated number of bytes starting from a designated address is written.

Figure 18:
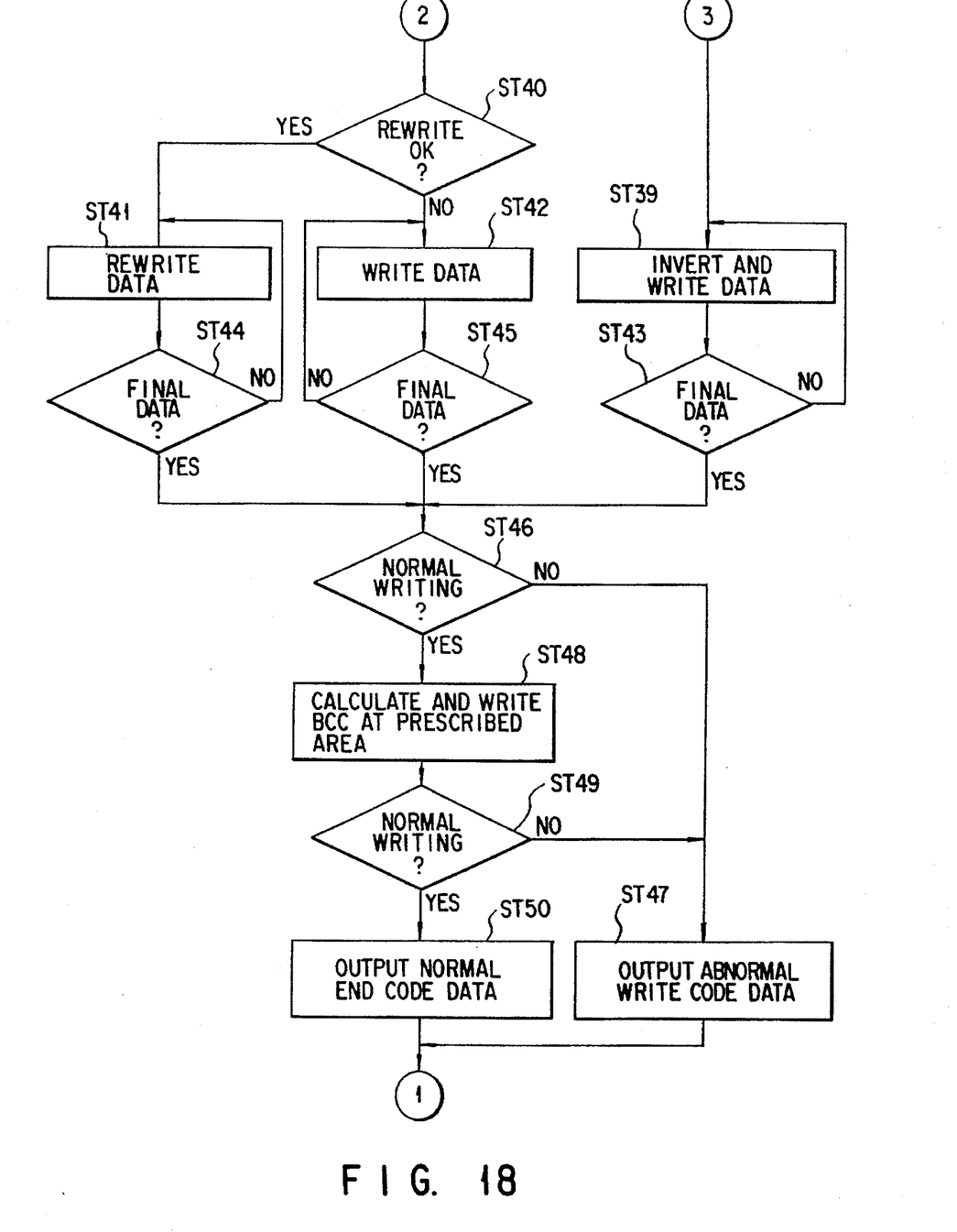
FIG. 18 is a flow chart for explaining the operation performed by the data write command.

If NO in step ST40, as shown in FIG. 18, in step ST42, the logical AND is calculated between data corresponding to the designated number of bytes starting from the designated address and the stored data of the area to be written, and the calculation result is written.

Steps ST43, ST44, and ST45 check whether the data operations performed in steps ST39, ST41, and ST42 operate on the final byte. If YES in steps ST43, ST44, and ST45, the flow advances to step ST46 to use the read-after-write check to check whether the data can be normally written. If NO in step ST46, the flow advances to step ST47 to output abnormal write code data, and returns to step ST1 to set the command wait state.

On the other hand, when a write operation normally operates on the designated final byte, the BCC of a word having data to be written is calculated and written at a predetermined position in step ST48. Step ST49 checks whether a write operation is normally performed. If YES in step ST49, normal data write end code data is finally output in step ST50, and the flow returns to step ST1 to set the command wait state. If NO in step ST49, abnormal write code data is finally output in step ST47, and the flow returns to step ST1 to set the command wait state.

Figure 19:
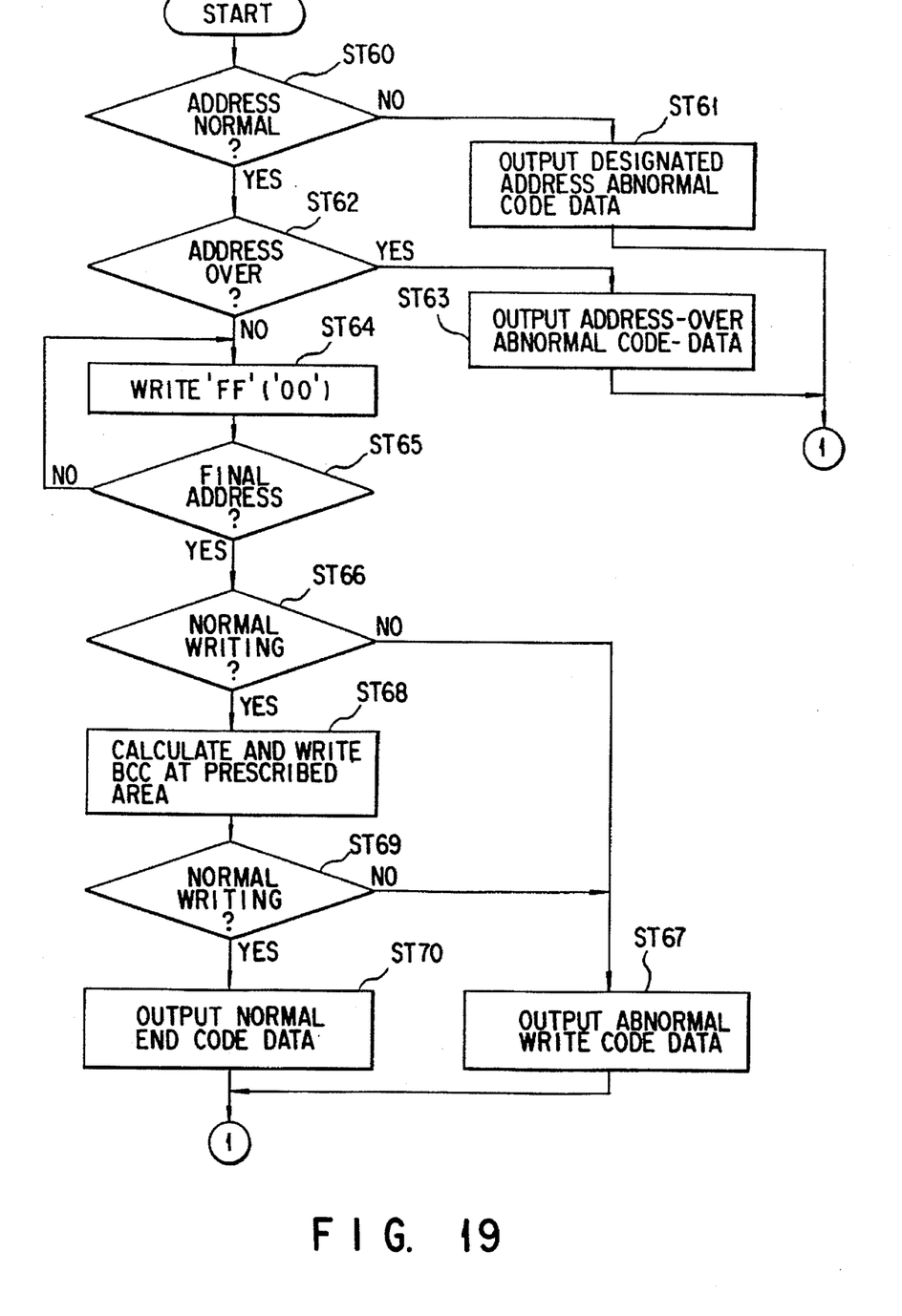
FIG. 19 is a flow chart for explaining an operation performed by the data erase command.

A data erase operation will be described below with reference to FIG. 19. As shown in FIG. 19, Step ST60 checks whether the top erase address in a command is set within a designated area. At this time, the lower limit of the range of address values is '0000' and the upper limit of the range is the final address of the corresponding area. In this check operation, when the designated top address falls outside the range, designated address abnormal code data is output in step ST61, and the flow returns to step ST1 to set the command wait state.

When the top address is set within the range, step ST62 checks whether an address is over, i.e., whether an erase area corresponding to the number of bytes of data to be erased is present in the corresponding area. For this purpose, it is checked whether a value obtained by subtracting "1" from the sum of the number of bytes of data and be erased to the designated address is equal to or smaller than the final address of the corresponding area. If the value is larger than the final address, the flow advances to step ST63 to output address over abnormal code data, and returns to step ST1 to set the command wait state.

If NO in step ST62, 'FF' data corresponding to the number of designated bytes starting from a designated address is written in step ST64. This operation is continuously performed up to a designated final byte. When the final address is confirmed in step ST65, step 66 checks whether data is normally written by the read-after-write check. If NO in step ST66, abnormal write code data is output in step ST67, and the flow returns to step ST1 to set the command wait state.

When the write operation of the 'FF' data is performed with regard to the designated final byte, the flow advances to step ST68 to calculate the BCC of a word having data to be written and write it at a predetermined position. When this write operation is normally performed, this is detected in step ST69, and the flow advances to step ST70 to finally output normal end code data and returns to step ST1 to set the command wait state. If NO in step ST69, abnormal write code data is finally output in step ST67, and the flow returns to step ST1 to set the command wait state.

In the operation described above, the memory 12 of AND logic incorporated in the IC card has been exemplified. However, when a memory of OR logic is used, the present invention can also be achieved. For example, when step ST15 of the flow chart of FIG. 16 checks the area attribute is AND logic memory of OR logic can be used if.

In the flow chart of FIG. 17, the present invention can be achieved by the following method. That is, when step ST38 checks whether the area attribute is OR logic, the OR logic is replaced with AND logic. When step ST36 checks whether all the data in the write area are set to be 'FF', the 'FF' is replaced with '00'.

In the flow chart of FIG. 19, the present invention can be achieved by the following method. That is, when a process for writing 'FF' data in step ST64 is replaced with a process for writing '00'.

Note that in FIGS. 16 and 19, after the writing process is completed for all data to be written a read-after-write check is performed to determine, whether the write operation was normally performed. The read-after-write check operation may alternatively be performed each time data corresponding to the specific number of bytes is written. In addition, the timing of calculation of the BCC and the timing of the write operation of the BCC can be changed. For example, the BCC may be calculated and written each time a data write operation in a word is ended.

In FIGS. 17 and 18, although the BCC is checked after all data are read, the timing for checking the BCC can be changed. For example, the BCC may be checked when data in a word is read.

In FIGS. 17 and 18, in write access, the logical AND or OR between stored data and input data is rewritten in place of the stored data. However, for example, when the memory element itself has an overwrite function using AND or OR logic, the calculation between the stored data and the input data may not be performed, and an overwrite operation may be performed using the function of the corresponding memory element.

In this embodiment, although any one of AND logic and OR logic is selected depending on an attribute assigned to each area, for example, two types of function codes may be set for each of the commands shown in FIGS. 7 and 8, and these function codes may be used as AND and OR commands, respectively.

In the embodiment, although the IC card has been exemplified as a device for performing data management, the shape of the device housing is not limited to a card-like shape. The shape can be changed into rod- or block-like shape. The present invention can be applied to not only a portable electronic device but also another electronic device. The arrangement and contents of the device can be variously changed without departing from the spirit and scope of the present invention.

The IC card exemplified in this embodiment uses the contact unit to perform transmission/reception of data with an external device. However, a method in which the IC card can perform transmission/reception of data using light, an electric field, a magnetic field, or the like without being in contact with the external device may be used.

As has been described above, according to the present invention, when areas having different logic types are set in a single logic memory, different initial states need not be set according to the different logic types. Therefore, there can be provided a storage data management apparatus capable of largely increasing the processing speed of a process for dividing a memory into a plurality of areas.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data storage apparatus for writing/reading data, comprising:

a memory having a plurality of divided areas;

logic type setting means for setting a logic type for each divided area of the memory;

first writing means for writing received write data in the memory;

second writing means for inverting the received data and for writing the inverted data in the memory;

first reading means for reading data from the memory and for directly outputting the data read;

second reading means for, reading data from the memory, inverting the read data, and outputting the inverted data;

a first selecting means for selecting., at a data writing time, one of the first and second writing means based on the logic type set by the logic type setting means; and a second selecting means for selecting, at a data reading time, one of said first and second reading means based on the logic type set by the logic type setting means.

2. A data storage apparatus according to claim 1, further comprising:

discriminating means for discriminating the logic types set for the divided areas by the logic type setting means;

first logic calculating means for performing a first predetermined logic calculation for the data read by the first reading means in accordance with the logic type discriminated by the discriminating means;

second logic calculating means for performing a second predetermined logic calculation for the data read by the second reading means in accordance with the logic type discriminated by the discriminating means; and wherein the first write means includes means for writing data logically calculated by the first logic calculating means in the memory.

3. An apparatus according to claim 2, wherein the first logic calculating means includes an AND circuit for calculating logical AND between the data and storage data stored in the memory.

4. An apparatus according to claim 2, wherein the first logic calculating means includes inverting means for inverting data and an AND circuit for calculating a logical AND between data inverted by the inverting means and storage data within the memory, and the second calculating means includes means for inverting and outputting data within the memory.

5. A data storage apparatus for writing/reading data in/from the divided areas, comprising:

a memory having a predetermined logic type that is divided into a plurality of areas;

write logic type setting means for setting a write logic type for each of the divided areas;

first writing means for directly writing received write data in the memory;

second writing means for inverting the received data and for writing the inverted data in the memory;

first reading means for reading data from the memory and for outputting the data read;

second reading means for reading data from the memory, inverting the data read, and outputting the inverted data; and selecting means for selecting the first writing means and the first reading means when the write logic type of an area set by the write logic type setting means coincides with a logic type of memory, and for selecting second writing means and the second reading means when the logic type of the area set by the write logic type setting means does not coincide with the logic type of the memory.

6. A data storage apparatus according to claim 5, further comprising:

discriminating means for discriminating the logic types set for the divided areas by the logic type setting means;

first logic calculating means for generating logical data by performing a predetermined logic calculation for the data read by the first reading means in accordance with the set logic type of the memory and the logic types set for the areas discriminated by the discriminating means;

writing means for writing the logical data generated by the first logic calculating means in the memory;

reading means for reading the logical data written in the memory; and second logic calculating means for performing a predetermined logic calculation for the data read by the second reading means in accordance with the set logic type of the memory and the logic types set for the areas discriminated by the discriminating means.

7. An apparatus according to claim 6, wherein the first logic calculating means includes an AND circuit for calculating logical AND between the data and storage data stored in the memory.

8. An apparatus according to claim 6, wherein the first logic calculating means includes inverting means for inverting the data and AND circuit for calculating a logical AND between the data inverted by the inverting means and storage data within the memory, and the second calculating means includes means for inverting and outputting data within the memory.

9. An apparatus according to claim 1, wherein the first and second writing means and the first and second reading means operate with respect to one of the areas in the memory.

10. An apparatus according to claim 5, wherein the first and second writing means and the first and second reading means operate with respect to one of the areas in the memory.

11. A data storage apparatus for writing and reading external data received from an external device, comprising:

a memory initially preset according to AND logic, wherein the memory stores attribute information denoting a logic operation to be used for writing the external data into the memory;

means for determining the logic operation to be used for writing external data into the memory based on the attribute information within the memory;

a first writing means for, when the logic operation determined by the determining means is based on AND logic, writing logical AND data obtained by performing a calculation based on the external data to be written and storage data within the memory;

a second writing means for, when the logic operation determined by the determining means is based on OR logic, writing logical OR data obtained by inverting bits of the external data to be written and by performing a calculation based on the bit-inverted external data and storage data within the memory;

a first reading means for outputting the data written in the memory by the first writing means using the AND logic; and a second reading means for outputting the data written in the memory by the second writing means using the OR logic after the data is bit-inverted.

12. A data storage apparatus for writing and reading external data received from an external device, comprising:

a memory initially preset according to OR logic and storing attribute information denoting a logic operation to be used for writing external data into the memory;

means for determining the logic operation to be used for writing external data into the memory based on the attribute information within the memory;

a first writing means for, when the logic operation determined by the determining means is based on OR logic, writing logical OR data obtained by performing a calculation based on the external data to be written and storage data within the memory;

a second writing means for, when the logic operation determined by the determining means is based on AND logic, writing logical OR data obtained by inverting bits of the external data to be written and by performing a calculation based on the bit-inverted external data and storage data within the memory;

a first reading means for outputting the data written in the memory by the first writing means using the OR logic; and a second reading means for outputting the data written in the memory by the second writing means using the AND logic after the logical AND data is bit-inverted.

13. A data storage apparatus for writing and reading external data received from an external device, comprising:

a memory initially preset according to AND logic and including a plurality of division areas, one of the division areas storing attribute information denoting a logic operation to be used for writing the external data into the areas;

a first writing means for writing logical AND data obtained by performing a calculation based on the external data to be written and storage data within the memory;

a second writing means for writing logical OR data obtained by inverting bits of the external data and by performing a calculation based on the bit-inverted external data and storage data within the memory;

first selecting means for selecting one of the first and second writing means in accordance with the attribute information of a write object area to which data is to be written, the attribute information being read out when the external data is being written into the write object area;

a first reading means for outputting the data written in the memory by the first writing means using AND logic;

a second reading means for outputting the data written in the memory by the second writing means using OR logic after the logical OR data is bit-inverted; and second selecting means for selecting one of the first and second reading means in accordance with the attribute information of a read object area from which data is to be read, the attribute information being read when the external data is being read out from the object area.

14. A data storage apparatus for writing and reading external data received from an external device, comprising:

a memory initially preset according to OR logic and including a plurality of division areas, one of the division areas storing attribute information denoting a logic operation to be used for writing the external data into the areas;

a first writing means for writing logical OR data obtained by performing a calculation based on the external data to be written and storage data within the memory;

a second writing means for writing logical OR data obtained by inverting bits of the external data and by performing a calculating based on the bit-inverted external data and storage data within the memory;

first selecting means for selecting one of the first and second writing means in accordance with the attribute information of a write object area to which data is to be written, the attribute information being read out when the external data is being written into the write object area;

a first reading means for outputting the data written in the memory by the first writing means using AND logic;

a second reading means for outputting the data written in the memory by the second writing means using OR logic after the logical OR data is bit-inverted; and second selecting means for selecting one of the first and second reading means in accordance with the attribute information of a read object area from which data is to be read, the attribute information being read when the external data is being read out from the read object area.

15. A data storage apparatus according to claim 16, wherein the attribute information further includes one of first information and second information, the first information indicating that data writing is to be performed only when the storage data within the memory is in an initial state, and the second information indicating that the data writing is to be performed irrespective of the state of the storage data within the memory; and the apparatus further comprising means for determining whether the external data can be written into the memory according to the attribute information.

16. A data storage apparatus according to claim 12, wherein the attribute information further includes one of first information and second information, the first information indicating that data writing is to be performed only when the storage data within the memory is in an initial state, and the second information indicating that the data writing is to be performed irrespective of the state of the storage data within the memory; and the apparatus further comprising means for determining whether the external data can be written into the memory according to the attribute information.

17. A data storage apparatus according to claim 13, wherein the attribute information further includes one of first information and second information, the first information indicating that data writing is to be performed only when the storage data within the memory is in an initial state, and the second information indicating that the data writing is to be performed irrespective of the state of the storage data within the memory; and the apparatus further comprising means for determining whether the external data can be written into the memory according to the attribute information.

18. A data storage apparatus according to claim 14, wherein the attribute information further includes one of first information and second information, the first information indicating that data writing is to be performed only when the storage data within the memory is in an initial state, and the second information indicating that the data writing is to be performed irrespective of the state of the storage data within the memory; and the apparatus further comprising means for determining whether the external data can be written into the memory according to the attribute information.

19. A data storage apparatus according to claim 14, wherein the first writing means, the second writing means, the first selecting means, the first reading means, the second reading means and the second selecting means are included in a CPU; and the first and second writing means and the first and second reading means comprise logic conversion means including logical OR data calculating means for calculating the logical OR data and bit inversion means for inverting the external data.

* * * * *